United States Patent [19]

Fitzgerald

[11] 4,031,920
[45] June 28, 1977

[54] PRESSURIZED HYDRAULIC SUMP SYSTEM

[76] Inventor: William Maurice Bard Fitzgerald, R.R. No. 1, Claremont, Ontario, Canada

[22] Filed: Sept. 9, 1974

[21] Appl. No.: 504,723

Related U.S. Application Data

[62] Division of Ser. No. 305,453, Nov. 10, 1972, Pat. No. 3,841,797.

[52] U.S. Cl. .............................. 138/31; 137/116.5; 417/543
[51] Int. Cl.² .......................................... F16L 55/04
[58] Field of Search ............ 60/413, 416, 595, 613; 138/30, 31; 417/323, 543; 92/108, 107; 137/116.5

[56] References Cited

UNITED STATES PATENTS

| | | | |
|---|---|---|---|
| 2,519,900 | 8/1950 | Geiger et al. | 92/108 X |
| 2,764,999 | 10/1956 | Stanbury | 138/31 |
| 2,830,609 | 4/1958 | Korsak et al. | 138/31 X |
| 2,937,663 | 5/1960 | Ashton et al. | 138/31 |
| 2,978,986 | 4/1961 | Carder et al. | 60/595 X |
| 3,005,306 | 10/1961 | Bush | 60/613 X |
| 3,015,345 | 1/1962 | Michael | 138/31 |
| 3,024,591 | 3/1962 | Ehrat et al. | 60/595 |
| 3,036,809 | 5/1962 | Kerr | 138/31 X |
| 3,119,230 | 1/1964 | Kosoff | 60/595 |
| 3,365,879 | 1/1968 | Panhard | 417/323 X |
| 3,669,151 | 6/1972 | Fleming | 138/31 |
| 3,905,580 | 9/1975 | Hooper | 92/108 X |

FOREIGN PATENTS OR APPLICATIONS

| | | | |
|---|---|---|---|
| 1,150,392 | 4/1969 | United Kingdom | 138/31 |
| 1,132,973 | 11/1968 | United Kingdom | 138/31 |

*Primary Examiner*—Henry K. Artis
*Assistant Examiner*—James E. Bryant, III

[57] ABSTRACT

A pressurized hydraulic sump system comprises a sump manifold to which a variable volume reservoir is connected, and is characterized by a piston which is displaceable by hydraulic means to vary the volume of the reservoir in accordance with the position of a valve which is responsive to sump pressure so that the piston is displaced in one or other direction according to whether the sump pressure is greater or less than a predetermined value.

4 Claims, 1 Drawing Figure

PRESSURIZED HYDRAULIC SUMP SYSTEM

CROSS REFERENCE TO RELATED APPLICATION

The present application is a divisional of my copending application Ser. No. 305,453, filed Nov. 10, 1972 (now U.S. Pat. No. 3,841,797 issued Oct. 15, 1975) relating to "Power Units".

BACKGROUND OF THE INVENTION

This invention relates to a pressurized hydraulic sump system intended particularly for use with a power unit of the type described in my copending application Ser. No. 305,453 (now U.S. Pat. No. 3,841,797) identified above.

In the power unit described in the above identified application, in order to ensure a flow of hydraulic fluid into the pump chambers, it is necessary to motivate the fluid by subjecting it to a pressure which is considerably higher than atmospheric. Previous sump systems have been open sump systems, quite unsuitable for the present purpose, or have been pressurized by very bulky apparatus. The present invention provides a compact sump system, suitable for use in a power unit of the type referred to, providing a large capacity sump in which the pressure is uniform and which does not occupy more space than its actual capacity.

SUMMARY OF THE INVENTION

A pressurized hydraulic sump system according to the invention comprises a sump manifold to which a variable volume reservoir is connected, and is characterised by a piston which is displaceable by hydraulic means to vary the volume of the reservoir in accordance with the position of a valve which is responsive to sump pressure so that the piston is displaced in one or other direction according to whether the sump pressure is greater or less than a predetermined value.

One embodiment of the invention, as applied to a power unit and transmission system for a wheeled vehicle, will now be described by way of example with reference to the accompanying drawings, in which:

FIG. 1 is a schematic diagram of a pressurized hydraulic sump system and control means therefor in accordance with the invention.

DESCRIPTION OF THE PREFERRED EMBODIMENT

Figure 1:
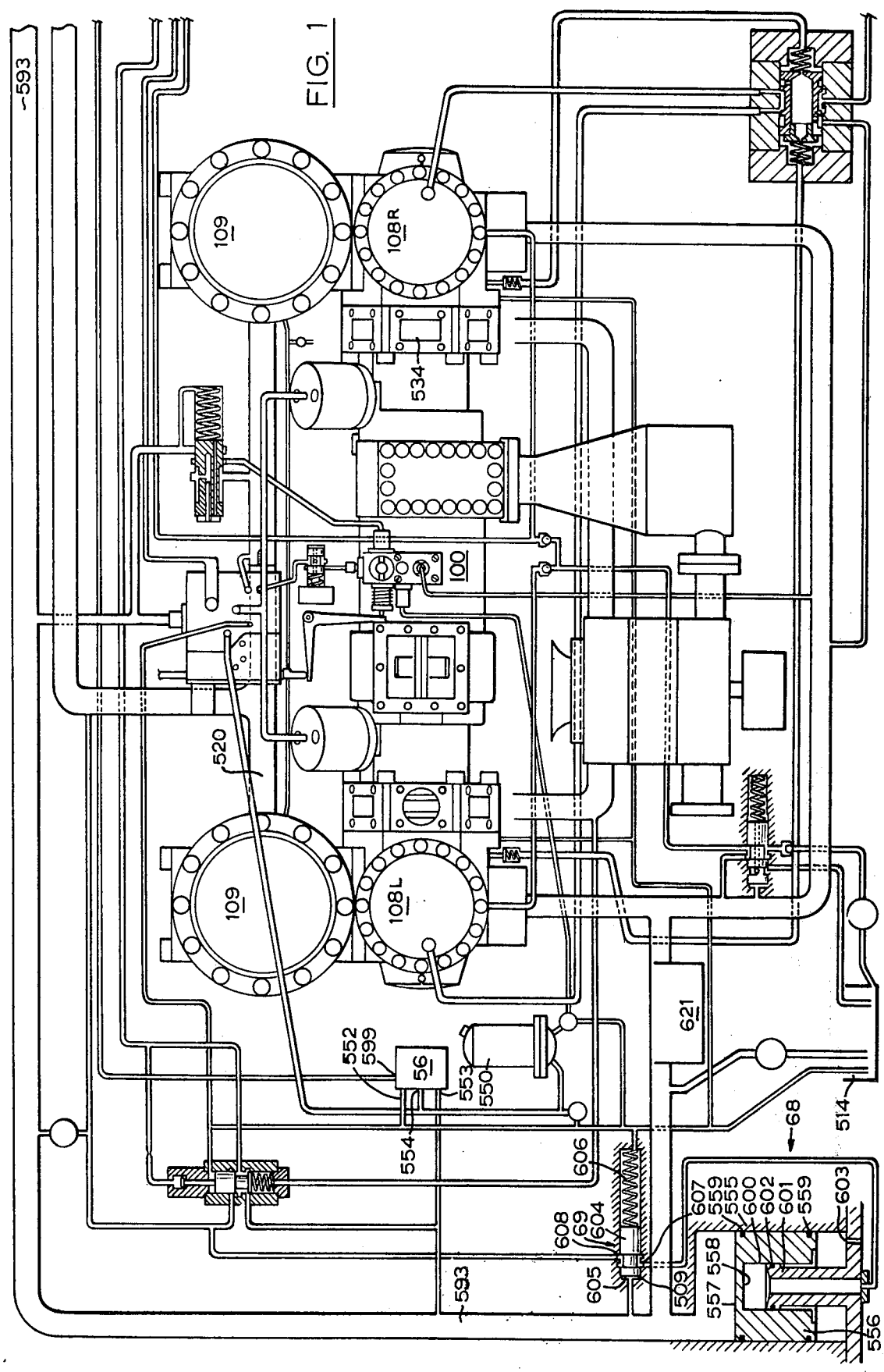

The power unit of the system to which the invention is applied comprises an internal combustion engine having a pair of opposed free pistons, a pair of pump units the pistons of which coact with the engine pistons, a pair of constant displacement hydraulic accumulators into which pressurized hydraulic fluid is pumped in accordance with the expansion strokes of the engine pistons, inlet ports and exhaust ports under the control of the pistons for admitting combustion air to, and exhausting combustion gases from, the engine, and valve operated fuel injection means actuated in accordance with the cyclical movements of the pistons to control the injection of fuel into the engine. The power output from the engine is a flow of pressurized hydraulic fluid, which in the present example is delivered from a pair of smoothing accumulators and used to drive hydraulic motors.

The mechanical construction of the power unit itself, and details of the transmission system, are fully described in the above-identified patent and are incorporated herein by reference.

The hydraulic system includes a constant ratio high pressure pump 56 motivated by medium pressure oil. This pump is used to raise the pressure at this location to whatever is required by the various hydraulically operated components of the system.

The oil whose pressure is to be raised is taken from a vented reservoir 514 and enters the constant pressure ratio high pressure pump 56 by an oilway 552. It is then delivered via an oilway 554 to a high pressure accumulator 550. The working oil enters by an oilway 599 from an accumulator and a valve; (not shown) after its energy has been spent, it leaves by oilway 553 to return to the manifold 593 of the pressurized oil sump system. When sufficient pressure is available at the oilway 599, the pump 56 will function automatically whenever the outlet pressure falls below the required valve.

The pressurized oil sump system includes a variable volume reservior 68 which must be able to contain all the oil that is expelled from the smoothing accumulators and the constant displacement accumulatores 108L and 108R of the power unit when they adjust from maximum to minimum pressure. The sump consists of a large hollow cylinder 55, in which a free piston 556 is able to move back and forth as dictated by differences in oil pressure acting on its top face 557 and its inner area 558. The piston 556 and cylinder 555 form a reservoir of variable volume. The free piston 556 may ride on two seals 559. Oil is supplied to the bore 600 of the free piston from a control valve 69 by a hollow stationary, axially extending piston 601, sealed by a ring 602. Leaking oil is conveyed away from vent 603 back to the vented reservoir 514.

The control valve 69 contains a shuttle 604 balanced between oil at pressurized oil sump pressure on one end 605 and a compression spring 606 at the other. When pressure in the sump line or sump mainfold 593 exerts less force against the shuttle 604 than does the spring 606, the shuttle rests in the position shown in the drawing.

Oil at the delivery pressure from the output manifold 520 of the power unit 100 enters the valve 69 through a port 608 and (when the shuttle 604 is in the position shown in the drawing) leaves by a port 607. The areas 557 and 558 of the free piston 556 are so proportioned that the output manifold delivery pressure, when exerted against surface 558, is always greater than the pressure caused by spring 606 pressing against the shuttle 604. Therefore when, under working conditions, the piston 556 and valve 604 are in the positions shown, the piston 556 must be moving up. Conversely if the pressure in the sump line or sump manifold 593, acting against the shuttle valve 604, gives rise to a force appreciably greater than that exerted by the spring 606, the valve will yield, at first closing oilway 607 and then opening it to the cylinder 509. Under these conditions the pressure exerted against the surface 558 is identical with that exerted against the surface 557, and as the area of surface 557 is greater than the area of surface 558, piston 556 is impelled down.

What I claim as my invention is:

1. A pressurized hydraulic sump system comprising means defining a variable volume reservoir,
   a sump manifold in fluid communication with said reservoir,
   a control valve having a first port communicating with the sump manifold and having a movable valve member therein responsive to sump pressure in said manifold, said means comprising a piston defining a movable wall of said reservoir which is backed by a fluid space and displaceable to vary the volume of the reservoir in response to differences between hydraulic pressure in said reservoir and hydraulic pressure within said fluid space, a source of fluid pressure, the control valve being a shuttle valve, an outlet port connected to said fluid space, and a further port connected to said source of fluid pressure said valve member being spring-biased and displaceable against its spring bias in response to sump pressure at said first port to a first position connecting said outlet port to said first port and a second position connecting said further port to said outlet port, the piston being displaceable in one or other direction according to whether the sump pressure is greater or less than the value determined by the magnitude of said spring bias.

2. A pressurized hydraulic sump system according to claim 1, wherein the piston is a free piston having a first face in said reservoir and exposed to sump pressure and a second face in said fluid space exposed to a pressure which is greater than the sump pressure by an amount determined by the position of the valve member.

3. A pressurized hydraulic sump system according to claim 2, wherein the reservoir is constituted by a cylinder housing a stationary, axially extending piston, the free piston having an internal bore embracing the stationary piston to define said fluid space, and the stationary piston having an internal bore communicating with the fluid space and said outlet port for admitting hydraulic fluid to and from said space in accordance with the position of the valve member 4. A pressurized hydraulic sump system according to claim 3, said second piston face being exposed to fluid pressure in said fluid space and being of smaller area than said first piston face.

* * * * *